United States Patent
Garcia

(10) Patent No.: US 7,881,888 B2
(45) Date of Patent: Feb. 1, 2011

(54) LOGICAL SCHEME FOR SEVERE FAULT DETECTION

(75) Inventor: Jorge Martinez Garcia, Risskov (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/681,409

(22) PCT Filed: Sep. 29, 2009

(86) PCT No.: PCT/DK2009/000212

§ 371 (c)(1),
(2), (4) Date: Apr. 2, 2010

(87) PCT Pub. No.: WO2010/037388

PCT Pub. Date: Apr. 8, 2010

(65) Prior Publication Data

US 2010/0235119 A1    Sep. 16, 2010

Related U.S. Application Data

(60) Provisional application No. 61/101,266, filed on Sep. 30, 2008.

(30) Foreign Application Priority Data

Sep. 30, 2008   (DK) .............................. 2008 01366

(51) Int. Cl.
G01R 31/00    (2006.01)
(52) U.S. Cl. ......................... 702/59; 702/185; 324/512
(58) Field of Classification Search ............ 702/58–62, 702/64, 65, 187; 324/512, 509, 543; 290/44, 290/55
See application file for complete search history.

(56) References Cited

U.S. PATENT DOCUMENTS 7,072,784 B2    7/2006    Wobben (Continued)

FOREIGN PATENT DOCUMENTS

EP    1561946 A2    8/2005

(Continued)

OTHER PUBLICATIONS

European Patent Office, International Search Report and Written Opinion issue din related international application No. PCT/DK2009/000212 dated Feb. 8, 2010.

(Continued)

*Primary Examiner*—Manuel L Barbee
(74) *Attorney, Agent, or Firm*—Wood, Herron & Evans, LLP

(57) ABSTRACT

The present invention relates to a method for determining location of faults in a wind power plant comprising a first plurality of wind turbines arranged in n groups, each group comprising $m_n$ wind turbines electrically arranged in series, each of the wind turbines having a fault detector and a timing device for recording a time of fault occurrence, all groups electrically connected via a bus bar. The method may comprise the steps of detecting a fault, obtaining a status indicator from each of the fault detectors and timing devices, evaluating time of fault occurrence for two wind turbines in each of the n groups to determine if the fault have occurred inside a group, evaluating if a fault is registered in the wind turbine closest to the bus bar in each group. Further the present invention relates to a wind park.

12 Claims, 2 Drawing Sheets

U.S. PATENT DOCUMENTS

Figure 1:
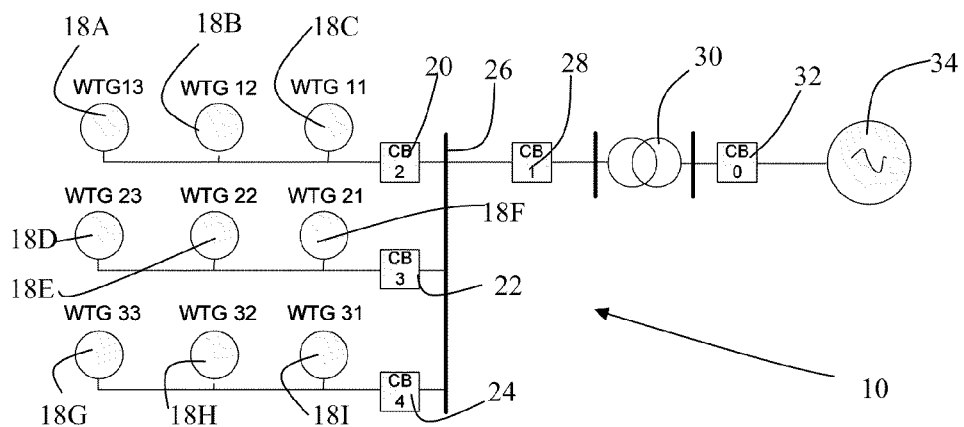

| | | | | |
|---|---|---|---|---|
| 2004/0230377 | A1* | 11/2004 | Ghosh et al. | 702/3 |
| 2006/0267560 | A1* | 11/2006 | Rajda et al. | 323/209 |
| 2007/0187955 | A1* | 8/2007 | Erdman et al. | 290/44 |

FOREIGN PATENT DOCUMENTS

| | | | |
|---|---|---|---|
| EP | 1665495 | A1 | 6/2006 |
| EP | 1808768 | A2 | 7/2007 |
| EP | 1931009 | A2 | 6/2008 |
| WO | 2004059814 | A2 | 7/2004 |

OTHER PUBLICATIONS

Danish Patent and Trademark Office, Search Report issued in related Danish patent application serial No. PA 2008 01366 dated May 15, 2009.

* cited by examiner

LOGICAL SCHEME FOR SEVERE FAULT DETECTION

The present invention relates to handling of faults in wind parks or wind power plants. Specifically the present invention relates to a method for determining the location of a fault in a wind park. Further the present invention relates to a method for determining if a fault has occurred inside or outside a wind park.

If a fault occurs outside a wind park, the wind turbines should perform Low Voltage Ride-Through, LVRT, in order to fulfill the grid codes. If the fault occurs inside the wind park the wind turbines should shut down until the fault is cleared.

If a fault occurs, the wind turbine(s) may unnecessarily provide reactive power. One object of the present invention is to provide a method that prevents wind turbines to stay connected if the fault is inside the installation.

Consequently there is a need for determining if a fault has occurred inside or outside a wind park.

The present invention provides a method for determining location of faults in a wind power plant comprising a first plurality of wind turbines arranged in n groups, each group comprising $m_n$ wind turbines electrically arranged in series, each of the wind turbines having a fault detector and a timing device for recording a time of fault occurrence, all groups electrically connected via a bus bar, the method comprising the steps of:
 i) detecting a fault,
 ii) obtaining a status indicator from each of the fault detectors and timing devices,
 iii) evaluating time of fault occurrence for two wind turbines in each of the n groups to determine if the fault have occurred inside a group,
 iv) evaluating if a fault is registered in the wind turbine closest to the bus bar in each group.

Further, the present invention in a second aspect relates to a wind park comprising a first plurality of wind turbines arranged in n groups, each group comprising $m_n$ wind turbines electrically arranged in series, each of the wind turbines having a fault detector and a timing device for recording a time of fault occurrence, all groups electrically connected via a bus bar to a transformer unit adapted to establish electrical connection from the wind park to a power grid,
 a monitoring unit adapted to receive fault indication and time of fault occurrence from each of the wind turbines, the monitoring unit further adapted to evaluating time of fault occurrence for two wind turbines in each of the n groups to determine if the fault have occurred inside a group and evaluating if a fault is registered in the wind turbine closest to the bus bar in each group.

Figure 2:
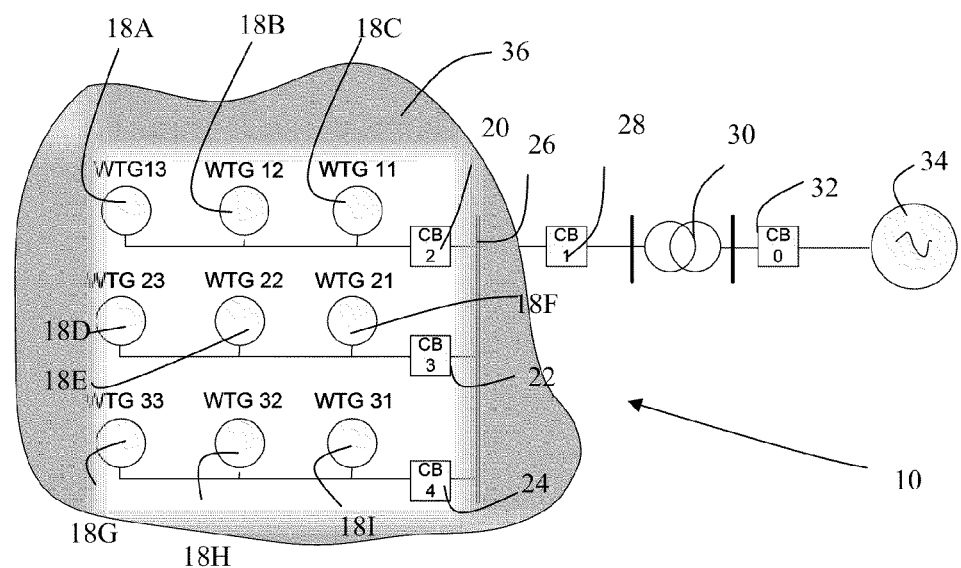
Figure 3:
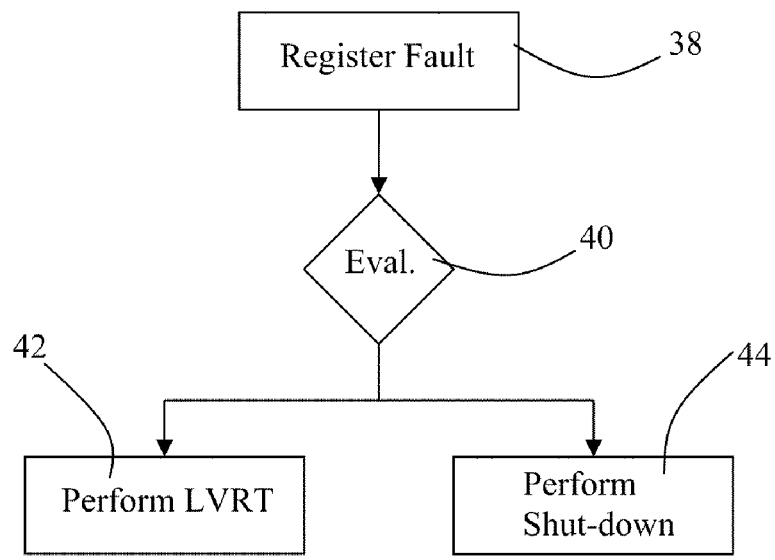
Figure 4:
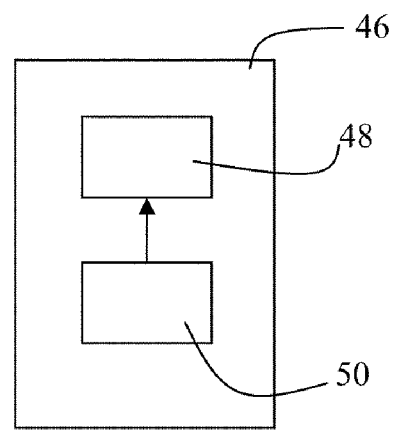

The present invention will now be discussed in more detail with reference to the drawings, in which:

FIG. 1 is a schematic illustration of a wind park,
 FIG. 2 is a schematic illustration of the wind park of FIG. 1 with a line indicating the location of a fault,
 FIG. 3 is a schematic illustration of the method, and
 FIG. 4 schematically illustrates a wind turbine generator.

FIG. 1 schematically illustrates a wind park 10 having three groups 12, 14 and 16 of wind turbines. Each group is illustrated as having three wind turbines 18A-18I. In other advantageous embodiments the groups need not have identical number of wind turbines. Also there may be more or less than three groups.

The wind turbines 18A-18I are also named WTG XY where X denote number in group and Y denote group number. In the following the WTG XY numbering will be used for the scheme.

The three groups each comprise a circuit breaker 20, 22 and 24. The circuit breakers 20, 22 and 24 are connected via a bus bar 26 to a circuit breaker 28. A transformer station 30 connects via circuit breaker 32 to the power grid 34.

Each of the wind turbines 18A-18I includes a fault detector and a timing device. When a fault is registered, the time of fault detecting is also registered. In order for the scheme to properly determine if a fault has occurred inside or outside the wind park, the relationship between the timing devices needs to be known. It is contemplated to be most simple to have the devices calibrated and synchronized. Alternatively the differences between the timing devices could be registered, e.g. in a central surveying computer.

The method according to the present invention may be implemented in a computer device adapted to continuously monitor the operation of the wind park. The wind turbines are advantageously connected to a communication network, such as a wired or wireless communication network. The communication network could be optically or electrically or microwave based, or a combination thereof.

The circuit breakers 20, 22 and 24, and also the other circuit breakers illustrated, could also be used to collect status information which could then be relayed to a surveying unit. The surveying unit could be a remotely placed computing device, e.g. a computing device placed at a monitoring station monitoring the performance of the wind park.

Due to increased demand in grid codes for the wind turbines to be connected even during zero voltage-dips, the scheme for protection of wind turbines has to include zero voltage in the minimal voltage settings for a certain period of time. A zero voltage-dip means that, electrically speaking, a fault has occurred very close to the wind farm.

A fault of this type may potentially lead to a situation where an internal fault in the wind farm or a sudden disconnection of one of the circuit breaker can not be distinguished from a fault occurring outside the wind farm.

Traditionally if it can not be established where the fault have occurred the control system in the wind turbines will try to react by pushing the voltage, if they can, or wait to reach the setting of minimum voltage.

Neither solution is an optimal solution as the wind turbines may be forced more than needed.

The teachings of the present invention propose a scheme to ensure that wind turbines remained operational during a severe fault.

A substation SCADA (Supervisory Control And Data Acquisition) in each wind turbine 18A-18I holds a vector comprising status indicator values indicating if a fault is detected or not. The values are illustrated in the matrix below:

| WTG11 Fault (1, 0) $t11$ | WTG21 Fault (1, 0) $t21$ | WTG31 Fault (1, 0) $t31$ |
|---|---|---|
| WTG12 Fault (1, 0) $t12$ | WTG22 Fault (1, 0) $t22$ | WTG32 Fault (1, 0) $t32$ |
| WTG13 Fault (1, 0) $t13$ | WTG23 Fault (1, 0) $t23$ | WTG33 Fault (1, 0) $t33$ |

Times "tii" are recorded when "WTG XY Fault" is set to 1, which occurs when a fault is detected by WTG XY. These times need to be quite accurate, at least relative to the speed of the propagation of electricity in the copper. Advantageously same precision clocks are used for recording the time. Further the clocks should be synchronized so that time differences may be observed.

The above exemplary embodiment may be expressed by the below logical expression, and can be executed in the substation controller, after receiving the data from the wind turbines:

(t11<t12<t13) AND (t21<t22<t23) AND
(t31<t32<t33)

AND (WTG 11 Fault=1) AND (WTG 21 Fault=1) AND
(WTG 31 Fault=1)

The evaluation of the first part of the expression is to establish if a fault have been registered by all wind turbines in each branch with certain sequence, i.e. to determine if the fault has occurred outside in or near one of the wind turbines in the branches. The second part of the expression is used to establish if all the circuits of the wind power plants have seen or detected the fault, i.e. if a circuit breaker opens unexpectedly only the wind turbines connected to this circuit will lose the voltage, therefore the above conditions is not fulfilled and the LVRT will be disabled.

The above expression returns the value 'true' the fault have occurred outside the wind park. If the above expression returns a 'false', then the wind turbines should not make LVRT.

With the above logical scheme it is possible to detect all faults inside the line shown in FIG. 2.

To detect all internal faults in the wind farm, the above embodiment of the logical scheme may be improved by further utilizing the status of the circuit breakers, or in some embodiments only some of the circuit breakers, which also causes the detection of the faults to take longer time as the actuation time of the breaker in some embodiments are close to 100 msec.

The above expression is then modified to (t11<t12<t13) AND (t21<t22<t23) AND
(t31<t32<t33)

AND (WTG 11 Fault=1) AND (WTG 21 Fault=1) AND
(WTG 31 Fault=1)

AND (CB0 and CB1 and CB2 and CB3 and CB4)

CBi represent indications of the status of the circuit breakers 20, 22, 24, 28 and 32. The above expression may of cause be adapted to any embodiment with different numbers of wind turbines.

After having evaluated the above expressions and provided the evaluation is true, then the substation controller or a global controller will not send a command to the wind turbines to disable the Low Voltage Ride-Through during the duration of the fault or until reset by an operator.

Alternatively, provided the evaluation is false the wind turbines will receive a command for disabling LVRT and so will be stopped.

As mentioned above it is advantageous that the evaluation may be performed at a central computer unit and status information may be provided to an operator. One example could be to implement the surveillance in the SCADA system.

The method according to the first aspect of the present invention comprises the steps of detecting a fault. The fault is detected in the wind turbines and may be relayed to a monitoring system or transmitted to a control system in the other wind turbines. Further the method may comprise obtaining a status indicator from each of the fault detectors and timing devices, e.g. by transmission as suggested above. A device may then evaluate time of fault occurrence for two wind turbines in each of the n groups to determine if the fault has occurred inside a group. The device may be an external device such as a computer or server or in the alternative an internal device located in one or more of the wind turbines. The device may then further evaluate if a fault is registered in the wind turbine closest to the bus bar in each group. The above evaluations are contemplated to allow determination of whether a fault has occurred inside or outside the wind park.

In an embodiment of the present invention the method may further comprise the wind turbine electrically located closed to the bus bar and the wind turbine electrically located farthest from the bus bar in each group be evaluated. This is contemplated to provide a more reliable determination of the location of the fault.

Furthermore the method may comprise evaluating time of fault occurrence for all wind turbines in each of the n groups to determine if the fault has occurred inside a group. This is further contemplated to improve the accuracy of the method.

In a further embodiment the wind turbine park may further comprise a transformer having a first electrical connection to the wind park and a second electrical connection to a power grid, two circuit breakers electrically arranged at the first and second electrical connection respectively, the method may then further comprise evaluating if the first and/or the second circuit breakers have been opened. The system may comprise additional circuit breakers, e.g. at each circuit or in some of the circuits, and the method may then further comprise evaluating if any of the additional circuit breakers has been opened.

The above described method may also include each of the timing devices recording a time of fault occurrence $t(X,Y)$ for the Y'th wind turbine in the X'th group, and the evaluation is performed using the formula or expression $(((t(X,Y)<t(X,Y+1))$ for $1<Y<m_n-1)$ AND $(WTG(1,X)=Fault)$ for $1<X<n$.

Further the evaluation may be performed using the formula:

$$((((t(X,Y)<t(X,Y+1))\text{ for }1<Y<m_n-1)\text{ AND }(WTG(1,X)=\text{Fault})\text{ for }1<X<n)$$

AND CB=open, where CB indicates that the circuit breaker is opened.

Still further the method may further comprise provided the evaluation is true the method further comprises the step of the wind turbines performing Low Voltage Ride-Through. In the alternative provided the evaluation is false, the method may further comprise the step of the wind turbines being stopped.

In an advantageous embodiment, the evaluation may be performed at a central computer unit and status information is provided to an operator.

As stated above a second aspect of the present invention relates to a wind park comprising a plurality of wind turbines arranged in n groups, each group comprising $m_n$ wind turbines electrically arranged in series, each of the wind turbines having a fault detector and a timing device for recording a time of fault occurrence, all groups electrically connected via a bus bar to a transformer unit adapted to establish electrical connection from the wind park to a power grid. Furthermore the wind park may comprise a monitoring unit adapted to receive fault indication and time of fault occurrence from each of the wind turbines, the monitoring unit further adapted to evaluating time of fault occurrence for two wind turbines in each of the n groups to determine if the fault have occurred inside a group and evaluating if a fault is registered in the wind turbine closest to the bus bar in each group.

Still further the monitoring unit may be adapted to perform any of the steps defined or mentioned in relation to the above method.

FIG. 3 is a schematic illustration of some steps of the method according to the first aspect of the present invention.

A fault is registered 38. As described above the time at which the fault is registered is also registered. Then the method proceeds to an evaluation 40 of the indication of the fault being registered and the time at which the fault is registered. The evaluation 40 may include a number of the wind turbines as described above. The evaluation results in a decision to either perform Low-Voltage Ride-Through, LVRT, 42 or shutting down one or more of the wind turbines 44.

The last step of actually executing the decision need not be a part of the method according to the present invention.

FIG. 4 schematically illustrates a wind turbine generator 46 having a fault detector 48 and a timing unit 50.

The monitoring unit may be located in one of the wind turbines. Alternatively the monitoring unit may be located remotely from the plurality of wind turbines. The monitoring unit may even be located remotely from the wind park.

The invention claimed is:

1. A method for determining location of faults in a wind power plant comprising a plurality of wind turbines arranged in n groups, each group comprising $m_n$ wind turbines electrically arranged in series, each of the wind turbines having a fault detector and a timing device for recording a time of fault occurrence, all groups electrically connected via a bus bar, the method comprising:
   detecting a fault;
   communicating a fault indication from each fault detector and a time of fault occurrence from each timing device as a status indicator from each of the fault detectors and timing devices to a monitoring unit;
   in response to detecting the fault, evaluating the time of fault occurrence for two wind turbines in each of the n groups with the monitoring unit to determine whether the detected fault has occurred inside one of the n groups;
   evaluating with the monitoring unit whether a fault indication is registered in the wind turbine closest to the bus bar in each group; and
   in response to the evaluations, causing the monitoring unit to make a control decision for the wind turbines of the wind power plant.

2. The method of claim 1, wherein, when evaluating the time of fault occurrence for two wind turbines in each of the n groups to determine if the fault has occurred inside a group, the time of fault occurrence for the wind turbine electrically located closed to the bus bar and the time of fault occurrence for the wind turbine electrically located farthest from the bus bar in each group are evaluated.

3. The method of claim 1, further comprising:
   evaluating time of fault occurrence for all wind turbines in each of the n groups to determine if the fault has occurred inside a group.

4. The method of claim 1, wherein the wind power plant further comprises a transformer having a first electrical connection to the wind power plant and a second electrical connection to a power grid, two circuit breakers electrically arranged at the first and second electrical connections, respectively, the method further comprising:
   evaluating if a circuit breaker is open.

5. The method of claim 1, wherein each of the timing devices records a time of fault occurrence $t(X,Y)$ for the Y'th wind turbine (WTG) in the X'th group, and the evaluation is performed using the formula:

$$(((t(X,Y)<t(X,Y+1)) \text{ for } 1<Y<m_n-1) \text{ AND } (WTG(1,X)=\text{Fault}) \text{ for } 1<X<n.$$

6. The method of claim 1, wherein the evaluation is performed using the formula:

$$(((( t(X,Y)<t(X,Y+1))) \text{ for } 1<Y<m_n-1) \text{ AND } (WTG(1,X)=\text{Fault}) \text{ for } 1<X<n) \text{ AND CB =open,}$$

where CB indicates that the circuit breaker is opened.

7. The method of claim 1, wherein if the evaluations are true, then the control decision is to cause the wind turbines to perform Low Voltage Ride-Through.

8. The method claim 1, wherein if the evaluations are false, then the control decision is to stop one or more of the wind turbines.

9. The method of claim 1, wherein the monitoring unit is a central computer unit and status information is provided to an operator.

10. A wind park comprising a plurality of wind turbines arranged in n groups, each group comprising $m_n$ wind turbines electrically arranged in series, each of the wind turbines having a fault detector and a timing device for recording a time of fault occurrence, all groups electrically connected via a bus bar to a transformer unit adapted to establish electrical connection from the wind park to a power grid, and
   a monitoring unit adapted to receive fault indication and time of fault occurrence from the wind turbines, the monitoring unit further adapted to evaluating time of fault occurrence for two wind turbines in each of the n groups to determine if the fault have occurred inside a group and evaluating if a fault is registered in the wind turbine closest to the bus bar in each group.

11. The wind park of claim 10, wherein the monitoring unit is located in one of the wind turbines or in the alternative located remotely from the plurality of wind turbines.

12. The wind park of claim 10, wherein the monitoring unit is adapted to evaluate time of fault occurrence for all wind turbines in each of the n groups to determine if the fault has occurred inside a group.

* * * * *

UNITED STATES PATENT AND TRADEMARK OFFICE
CERTIFICATE OF CORRECTION

| | | |
|---|---|---|
| PATENT NO. | : 7,881,888 B2 | Page 1 of 1 |
| APPLICATION NO. | : 12/681409 | |
| DATED | : February 1, 2011 | |
| INVENTOR(S) | : Jorge Martinez Garcia | |

It is certified that error appears in the above-identified patent and that said Letters Patent is hereby corrected as shown below:

On the Title page, Item (56), OTHER PUBLICATIONS, change "issue din" to --issued in--.

In the 11th line of the abstract Item (57), change "have" to --has--.

In column 1:
Line 33, change "have" to --has--.
Line 48, change "have" to --has--.

In column 2:
Line 35, change "breaker" to --breakers--.
Line 38, change "have" to --has--.

In column 3:
Line 20, change "have" to --has--.
Line 22, after "outside", insert --,--.
Line 27, change "conditions" to --condition--.
Line 29, before "The", insert --If-- and change "have" to --has--.
Line 40, change "are" to --is--.
Line 55, change "cause" to --course--.

In column 5:
Line 4, change "have" to --has--.
Line 57, claim 2, change "closed" to --close--.

In column 6:
Line 29, Claim 8, after "method", insert --of--.
Line 44, Claim 10, change "to" to --for--.
Line 46, Claim 10, change "have" to --has--.

Signed and Sealed this
Twenty-second Day of March, 2011

David J. Kappos
*Director of the United States Patent and Trademark Office*